March 1, 1955 — O. BURAWOY — 2,703,019
TRANSMISSION TENSIONER
Filed Dec. 23, 1952 — 3 Sheets-Sheet 2
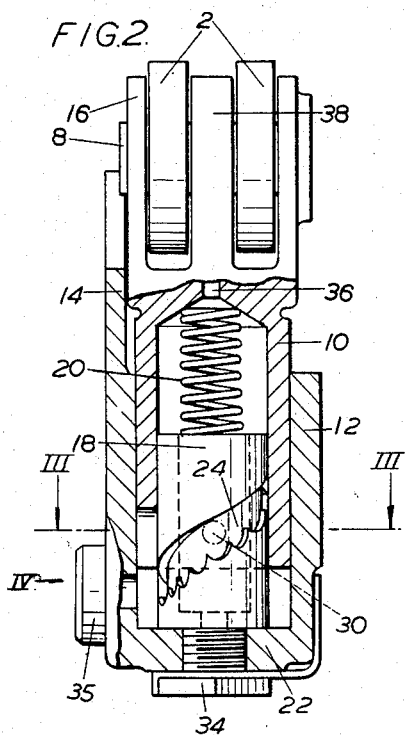
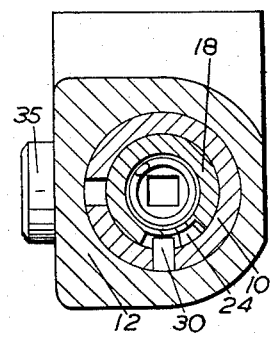
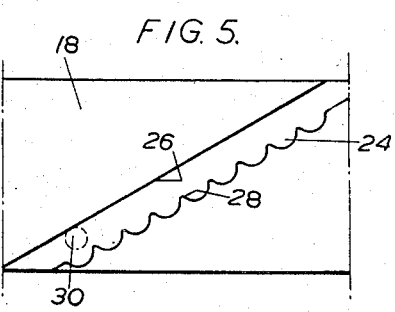
Inventor
ONISSIM BURAWOY,
By Robert B. Pearson
Attorney

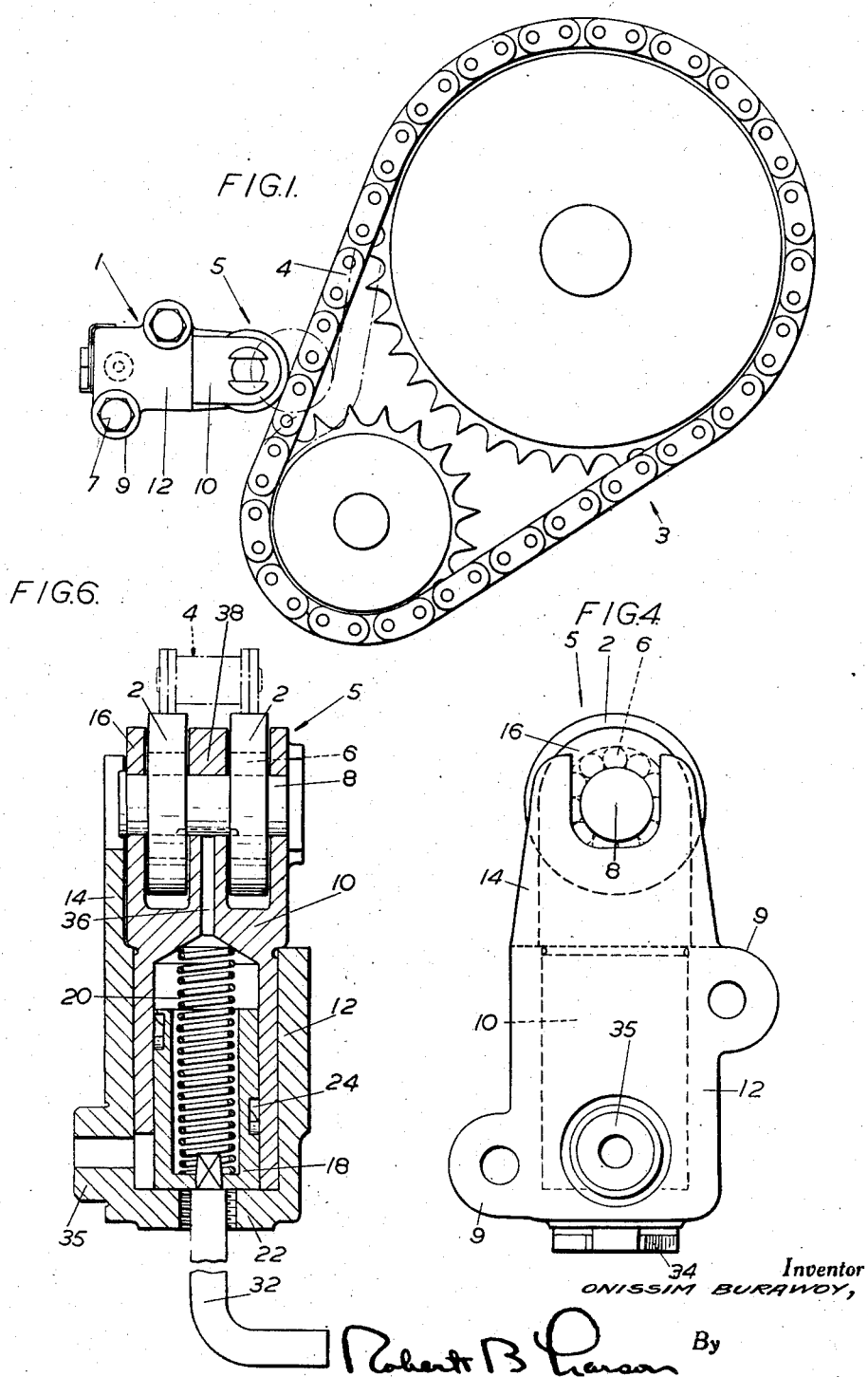

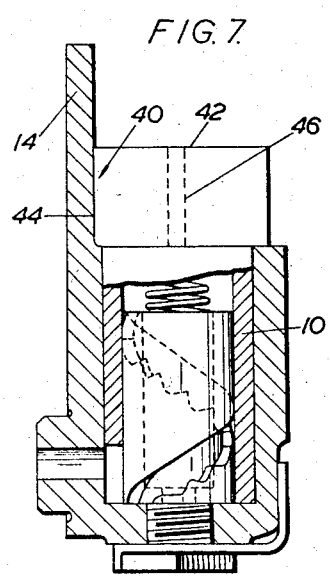
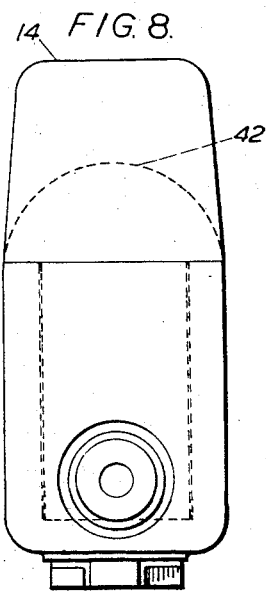
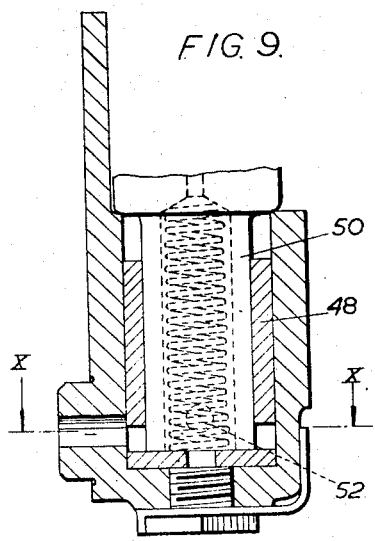
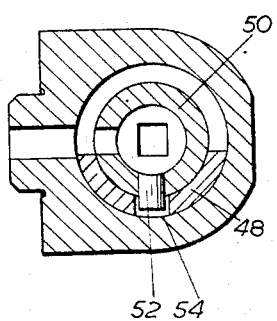

United States Patent Office 2,703,019
Patented Mar. 1, 1955

2,703,019

TRANSMISSION TENSIONER

Onissim Burawoy, Heald Green, Cheadle, England, assignor to The Renold and Coventry Chain Company Limited, Manchester, England Application December 23, 1952, Serial No. 327,614

6 Claims. (Cl. 74—242.11)

This invention relates to tensioners for chain, belt and like transmissions, that is to say, to devices which will automatically take up slack, both when the chains, belts or the like are installed and thereafter as they stretch in use. Such a tensioner should include a non-return mechanism so that vibration or irregular running of the chain or the like cannot reverse the progressive action of the tensioner. Hitherto tensioners with non-return mechanisms have been bulky and the mechanism has been difficult to reset when the chain or the like on which the tensioner acts has stretched so much that it has to be replaced. Size is a matter of great importance in tensioners used with small chain drives, e. g. chain drives for cam shafts for automobile engines and the like.

The primary object of the present invention is to provide a compact transmission tensioner incorporating non-return mechanism.

It is a further object to form the tensioner of few and simple components which are readily assembled.

In a tensioner according to the present invention a member carrying means engaging and transmitting force to the chain, belt or the like is coaxial with a second member, and the two members are urged in opposite directions along their common axis and have cooperating parts which permit relative movement of the members in the direction in which they are urged but prevent contrary movement through more than a small distance. The means engaging the transmission may be integral with the first member.

Preferably the first member is a plunger restrained from rotary movement and working in a stationary housing which provides axial abutment for the second member. Preferably moreover, the cooperating parts are the walls of a helical channel in one member and surfaces on the other member, which may be a single pin which projects into the channel, the resistance of the two walls to movement of the pin over them differing.

In the preferred construction of the non-return mechanism the first member carries the pin, and the second member is cylindrical. The cylinder may surround the plunger, the pin being on the outside of the plunger, but preferably the plunger is hollow and surrounds the cylinder, the pin projecting inwards from the inner wall of the plunger. The cylinder is free to turn about its axis within the housing but is restrained from moving axially in relation to the housing. When the plunger tends to move outwards, the pin engages a smooth side wall of the groove and offers very little resistance to movement of the pin along it. In consequence, the plunger moves outwards and causes the cylinder to rotate. Upon a slight return movement of the plunger, the pin engages the other wall of the groove, and the surface of this wall is such that movement of the pin over this surface through more than a small distance is prevented. Preferably this wall is serrated and the serrations provide the same step-by-step control as the teeth of a ratchet without involving the complexity and bulk associated with a ratchet-and-pawl mechanism. The extent of return movement permitted to the member which bears on the chain, belt or the like depends on the backlash in the non-return mechanism, and in particular on the width of the helical groove. The extent should be sufficient to allow for changes in length of the chain or the like due to changes in temperature.

The force transmitted to the member which bears on the chain or the like may be applied by a spring, a liquid under pressure, a solenoid or in other ways. If the force is applied hydraulically, the inner end of the housing, i. e. the end remote from the chain or the like, is closed so that the housing forms a chamber for the operating liquid. In other cases it is most conveniently but not necessarily closed. With the preferred non-return mechanism, part at least of the force may be applied by a compression spring confined between the outer end of a cavity in the plunger and the inner end of a cavity in the cylinder, the spring also providing the force which restrains axial movement of the cylinder. This spring may be assisted in propelling the plunger by oil admitted under pressure to the housing and from there to the interior of the plunger by passages in the plunger and cylinder. This is particularly advantageous as it allows the oil also to be used for lubrication; for example the oil may lubricate bearings in the member which bears on the chain or the like, the whole mechanism, the surfaces of contact between the chain and the tensioner head, and the chain itself. The oil in the housing will also serve to damp slight reciprocations of the plunger and at the same time such slight reciprocations will tend to produce a pumping action.

The accompanying drawings show the preferred tensioner according to the present invention together with two modifications. In these drawings:

Figure 1 is an elevation of the tensioner in engagement with a chain drive;

Figure 2 is a view of the tensioner principally in longitudinal section and on a larger scale;

Figure 3 is a transverse section on the line III—III in Figure 2;

Figure 4 is an elevation seen in the direction of the arrow IV in Figure 2;

Figure 5 is a development of the circumference of the cylinder in the tensioner;

Figure 6 is a view resembling Figure 2, but wholly in section and showing the parts displaced.

Figure 7 is a section similar to Figure 2, through one modified construction;

Figure 8 is a side elevation of this construction;

Figure 9 is a section similar to Figure 2 through the second modification; and

Figure 10 is a section on the line X—X in Figure 9.

The tensioner 1 shown in Figures 1 to 6 is intended for use in conjunction with a roller chain, such as the small chain drive 3 shown in Figure 1. The tensioner includes a housing 12 and a head 5, and the housing is fixed in position by bolts 7 passing through lugs 9. Initially the positions of the head 5 and chain 3 are as shown in full lines, and as the chain wears, the head 5, which bears on the chain, moves outwards from the housing, pushing the chain before it, into the position shown in dotted lines.

As shown in Figures 1 and 6, the head 5 comprises two rollers 2 which engage the link plates of the chain 4. The rollers 2 are mounted on roller bearings 6 on a spindle 8 between forks on the end of a plunger 10.

The inner part of the plunger 10 is cylindrical with a cylindrical bore and can reciprocate in a bore in the housing 12. An arm 14 with a flat face projects from the housing in engagement with a flat face on one of the forks 16 of the plunger 10, and a compression spring 20 is confined between the outer end of the bore in the plunger and the inner end of the bore in the cylinder. This spring urges the plunger out of the housing and the cylinder against the inner end or abutment 22 of the housing. A helical groove 24 is formed in the outer circumference of the cylinder 18. This groove, as shown in Figure 5, which is a development of the circumference of the cylinder, has a smooth upper wall 26 and a serrated lower wall 28. A pin 30 on the plunger 10 lies in the groove 24 and cooperates with the upper or lower wall according to the direction in which the plunger is tending to move.

When the chain slackens as a result of wear or for any other reason the plunger 10 moves out of the housing and the pin 30 engages the upper wall 26 of the groove 24. The resistance to the movement of the pin along the wall 26 is small, and as the pin moves along the wall under the action of the spring 20 the cylinder 18 turns clockwise as seen in Figure 3. When the chain becomes tauter as a result of vibration or temperature change, then the pin 30 engages the lower wall 28 and becomes seated in one of the serrations so that movement of the pin along the wall 28 is prevented. In consequence the cylinder does not turn backwards and the plunger is prevented from moving further backwards. At any time, the plunger can execute a small reciprocating movement within the limits imposed by the width of the groove 24 and the shape and size of the serrations, this movement allowing for temperature expansion and unevenness in the chain.

The pin 30 may be of other shapes in cross-section, e. g. wedge-shaped, square or oval, the serrations being of complementary shape, but it is preferred to make the pin round and the serrations part-cylindrical, as shown.

The groove 24 may extend completely through the wall of the cylinder and thus become a slot.

It is desirable to be able to withdraw the plunger into the housing when, for example, a chain is to be replaced. Provision is therefore made for inserting a key 32, as shown in Figure 6, into a square hole in the inner end of the cylinder 18. This key passes through an opening in the inner end of the housing which is normally closed by a cap 34. When the cylinder is turned anti-clockwise, as seen in Figure 3, then the upper wall 26 of the groove 24 engages the pin 30 and draws the cylinder 18 and the plunger 10 together. The helical groove 24 extends to the ends of the cylinder 18 so that it is possible for the pin 30 to pass beyond the inner end of the cylinder and be engaged by the end face. Thus the spring 20 is retained in a state of compression and it is possible to remove the plunger 10, cylinder 18 and spring 20 as a unit from the housing. Equally, in assembling the tensioner it is convenient to confine the spring in this way, then to insert the assembly in the housing and to release the spring by means of a key 32.

The action of the spring 20 is assisted by oil fed into the housing 12 through a spigot 35. This oil urges the plunger 10 out of the housing and part of it passes up a passage 36 in the central fork 38 of the plunger and so reaches the roller bearings 6. Any small reciprocating movements of the plunger exert a pumping action on the oil.

The member which bears on the chain or the like may take various other forms. One of these is shown in Figures 7 and 8, in which the operating mechanism is identical with that of Figures 2 to 4. The head 40 in this case is fixed to the plunger 10 and presents a semi-cylindrical surface 42, which rides on the chain, and a flat side surface 44 which bears against a side plate 14, and a lubricating passage 46 is made in the centre of the head.

As other alternatives to the two rollers 2 shown in the drawings, a toothed wheel may be provided to engage the rollers of the chain, a single wide roller may be provided for a belt and a grooved pulley for a rope. The roller or wheel may run on roller bearings and the wearing faces be of any suitable material calculated to give a long life and minimum of audibility.

In the modification shown in Figures 9 and 10, the arrangement of the cylinder and plunger is inverted, the cylinder 48 surrounding the plunger 50. A pin 52 projects radially outwards from the plunger into a helical slot 54 in the wall of the cylinder. For the rest, the construction is similar to that of Figures 1 to 6.

The non-return mechanism may be modified further in that the pin may be on the cylinder and the helical channel in the plunger, whether the plunger be inside or outside the cylinder. In other words, the channelled member may be the one which moves axially while the member carrying the pin is restrained from axial movement but rotates.

Yet again the pin and channel may be modified. For instance, both walls of the channel may be smooth and the surfaces of the pin which engage them may differ, one being smooth and the other having a high coefficient of friction, e. g. being made of rubber. This modification is possible when the interior of the non-return mechanism is dry, that is to say, not lubricated.

Finally, in constructions in which the amount of backlash or reciprocating movement permitted to take account of temperature expansion and unevenness of the chain or the like is fairly large, so that the width of the channel can be greater than that shown, the surfaces which engage the opposite walls of the channel may be on separate projections instead of being the opposite surfaces of a single pin. Such separate projections can be made of materials having different coefficients of friction, so that the different resistances to movement in the opposite directions may be provided in this way or the difference between them increased if one wall is serrated and the other not.

I claim:

1. A transmission tensioner comprising a housing defining a bore open at one end and limited at the other end by an abutment, a plunger member reciprocable in said housing, interengaging surfaces on said plunger member and housing preventing relative rotation thereof, means carried by said plunger member and lying outside said housing for engaging a transmission, a second member coaxial with said plunger member and in engagement with said abutment, a compression spring confined between said members, walls defining a helical channel in one of said members, and surfaces on the other of said members co-operating with said walls to permit movement of said plunger member out of said housing and resist movement of said plunger member through more than a small distance into said housing.

2. A transmission tensioner comprising a housing defining a bore open at one end and limited at the other end by an abutment, a plunger member reciprocable in said housing, interengaging surfaces on said plunger member and housing preventing relative rotation thereof, means carried by said plunger member and lying outside said housing for engaging a transmission, a cylindrical member coaxial with said plunger member and in engagement with said abutment, means urging said plunger member out of said housing and said cylindrical member against said abutment, two opposed walls defining a helical channel in one of said members, and a pin projecting from the other of said members and co-operating with said walls to permit movement of said plunger member out of said housing and resist movement of said plunger member through more than a small distance into said housing.

3. A transmission tensioner comprising a housing defining a bore open at one end and limited at the other end by an abutment, a plunger member reciprocable in said housing, interengaging surfaces on said plunger member and housing preventing relative rotation thereof, means carried by said plunger member and lying outside said housing for engaging a transmission, a cylindrical member within and coaxial with said plunger member and in engagement with said abutment, a compression spring confined between said members, two opposed walls defining a helical channel in said cylindrical member, and a pin projecting inwards from said plunger member and co-operating with said walls to permit movement of said plunger member out of said housing and resist movement of said plunger member through more than a small distance into said housing.

4. A transmission tensioner as claimed in claim 3 wherein said helical channel extends to the ends of said cylindrical member, and said cylindrical member is formed at the end remote from the plunger member with a key socket.

5. A transmission tensioner as claimed in claim 3 wherein one of said walls is smooth and the other of said walls is serrated.

6. A transmission tensioner comprising a housing defining a bore open at one end and limited at the other end by an abutment, a plunger member reciprocable in said housing, interengaging surfaces on said plunger member and housing preventing relative rotation thereof, means carried by said plunger member and lying outside said housing for engaging a transmission, a second member coaxial with said plunger member and in engagement with said abutment, means urging said plunger member out of said housing and said second member against said abutment, and cooperating parts on said members which permit movement of said plunger member out of said housing and resist movement of said plunger member through more than a small distance into said housing, said housing being formed with an inlet opening for oil, and said plunger being formed with a passage for leading oil from within said housing to said means for engaging a transmission.

References Cited in the file of this patent

UNITED STATES PATENTS

| | | |
|---|---|---|
| 1,783,987 | Thompson | Dec. 9, 1930 |
| 1,806,901 | Hawley | May 26, 1931 |
| 2,213,992 | Morse | Sept. 10, 1940 |
| 2,575,313 | Covert et al. | Nov. 13, 1951 |